United States Patent Office  3,155,609
Patented Nov. 3, 1964

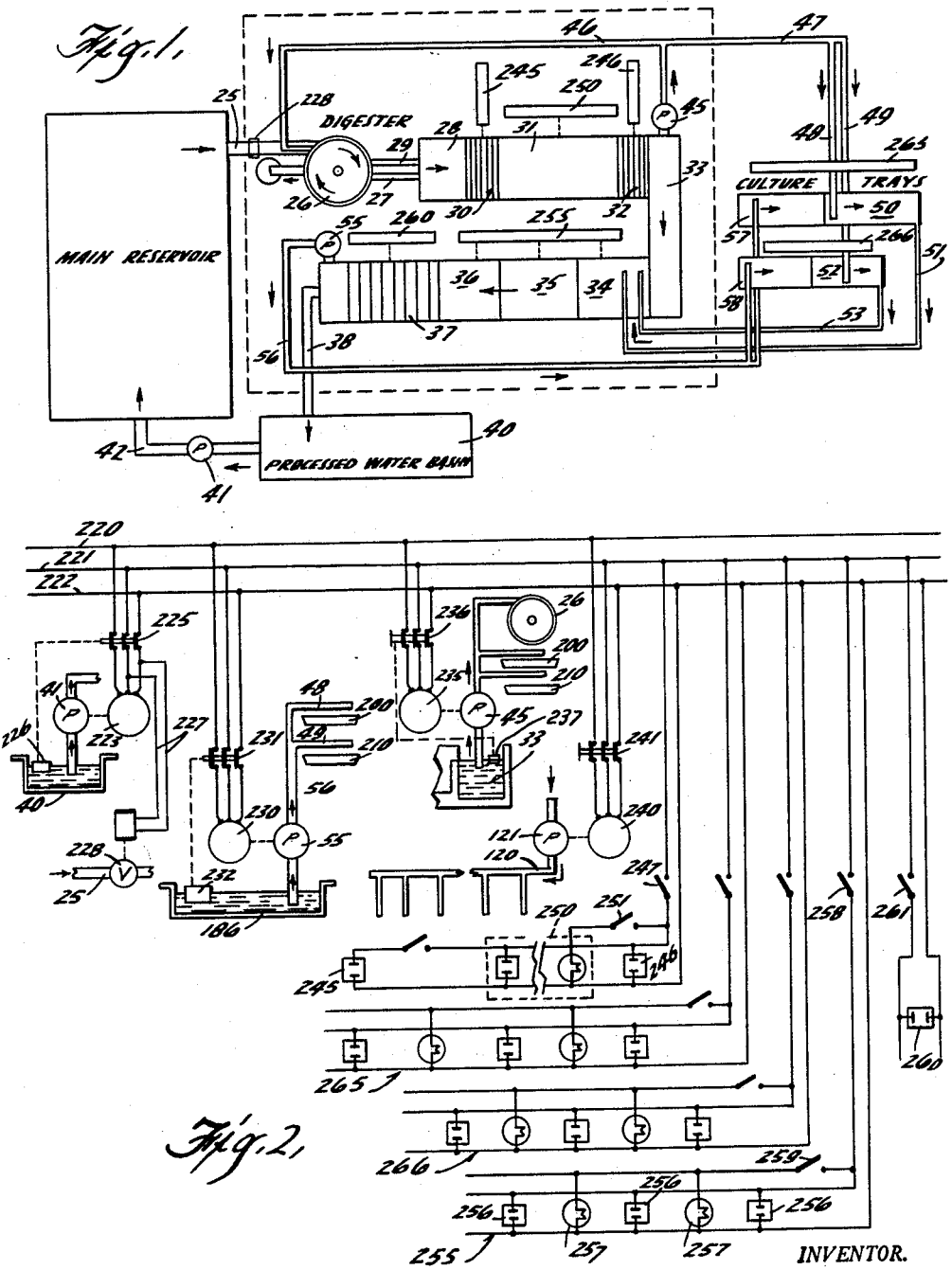

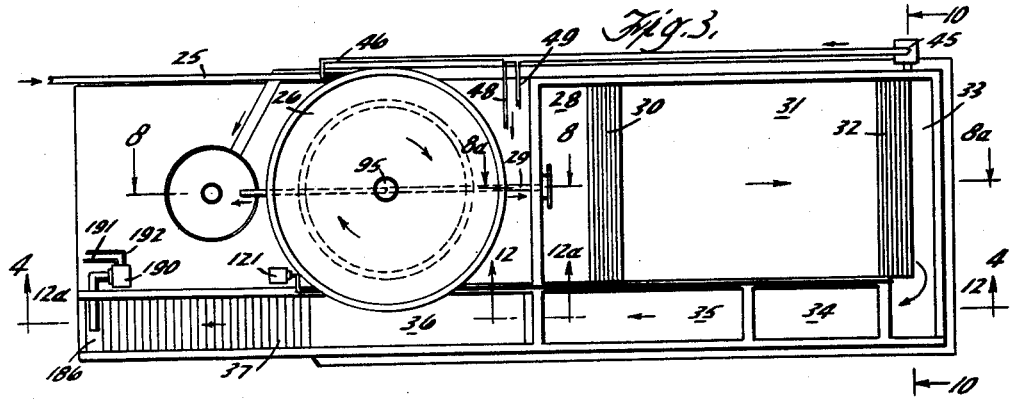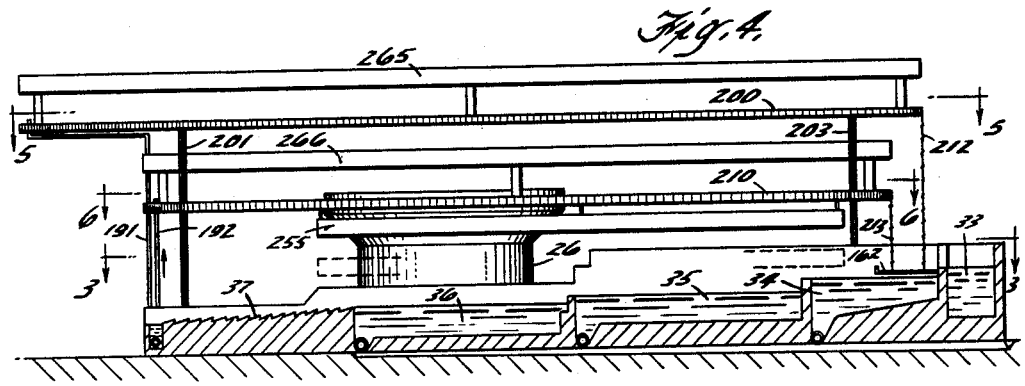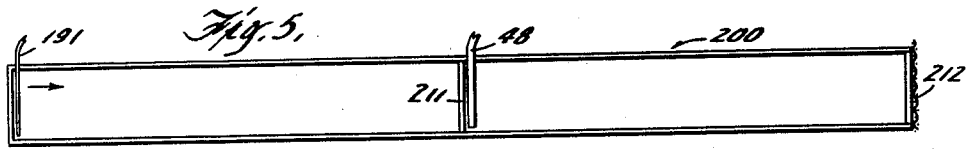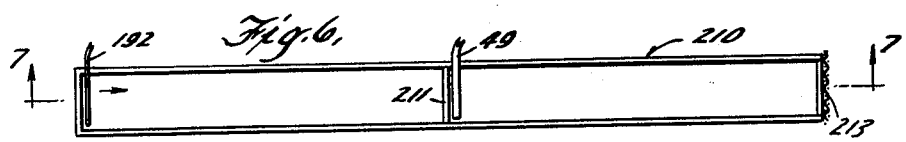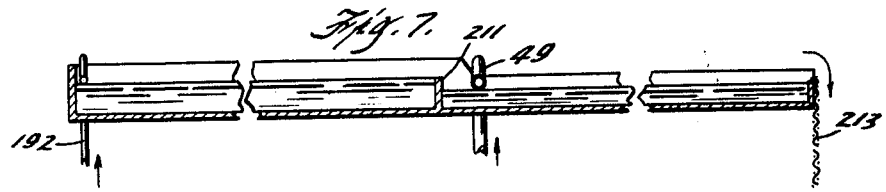
INVENTOR.
LEONARD F. PAMPEL
BY
Wheeler, Wheeler and Wheeler
ATTORNEYS.

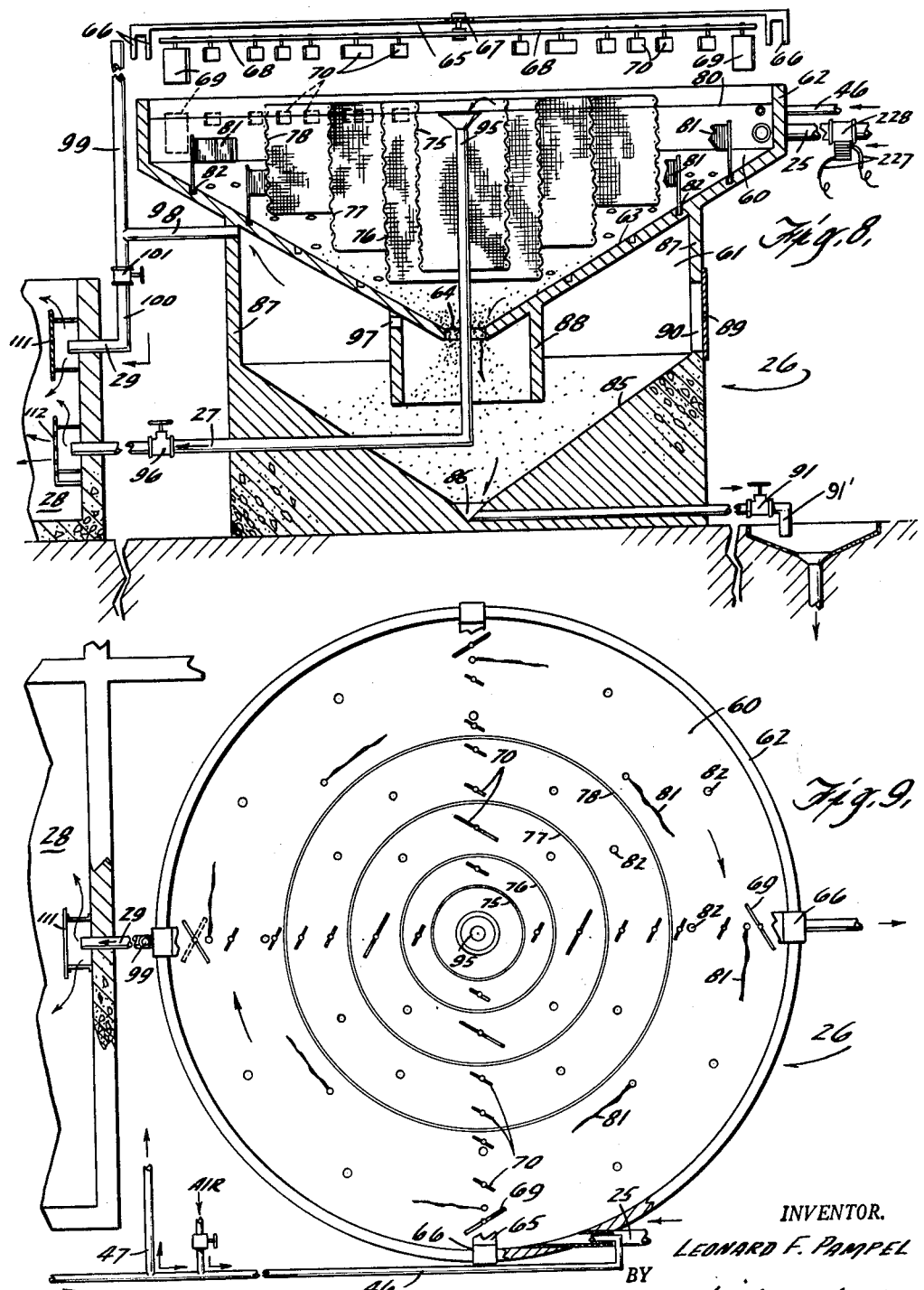

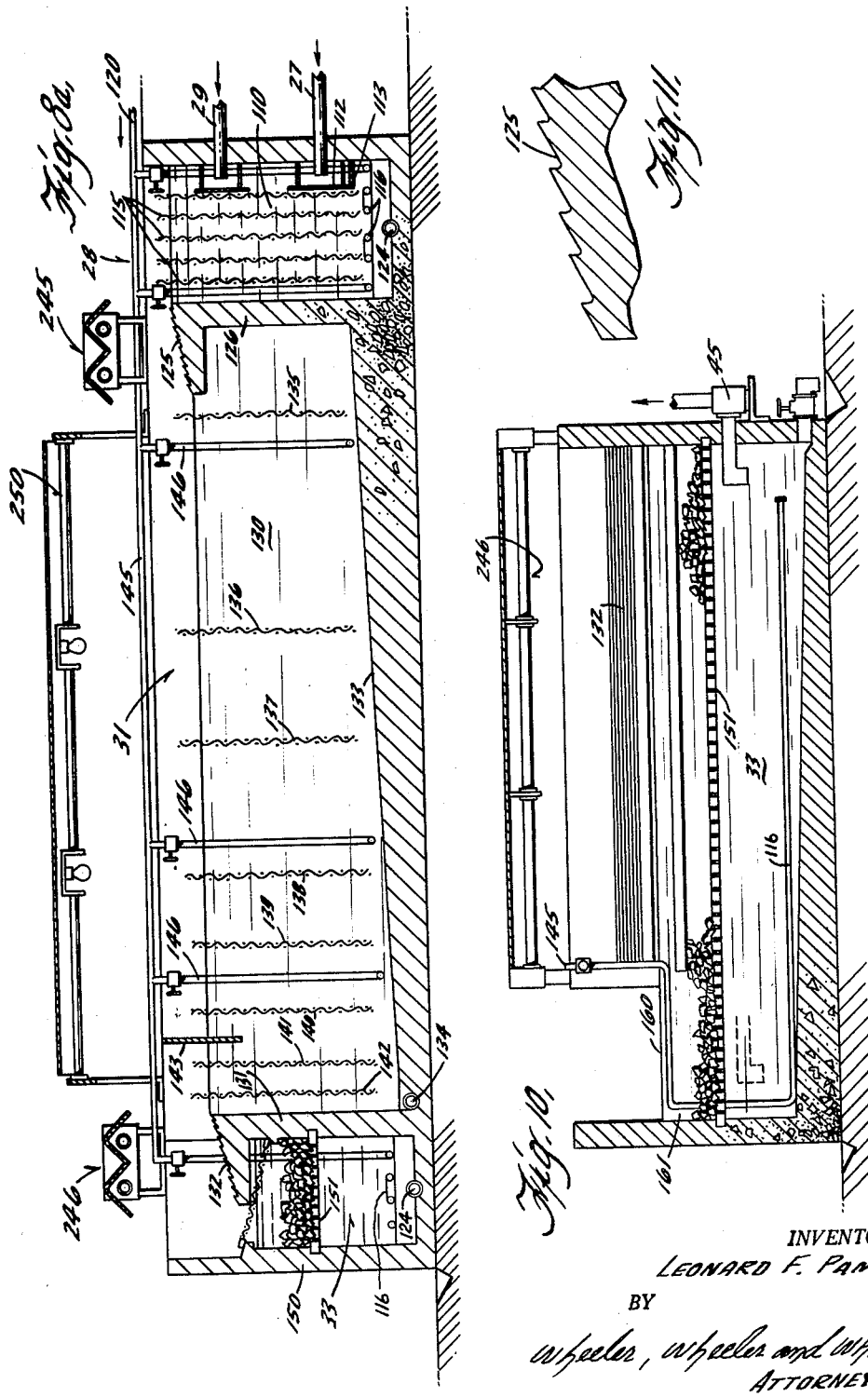

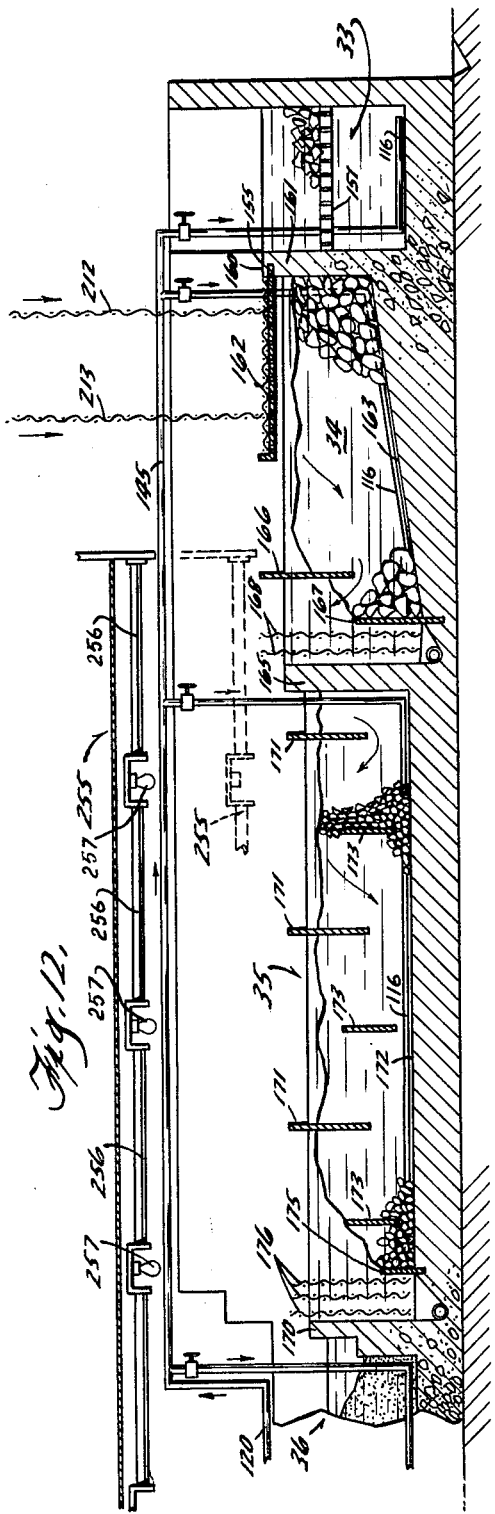
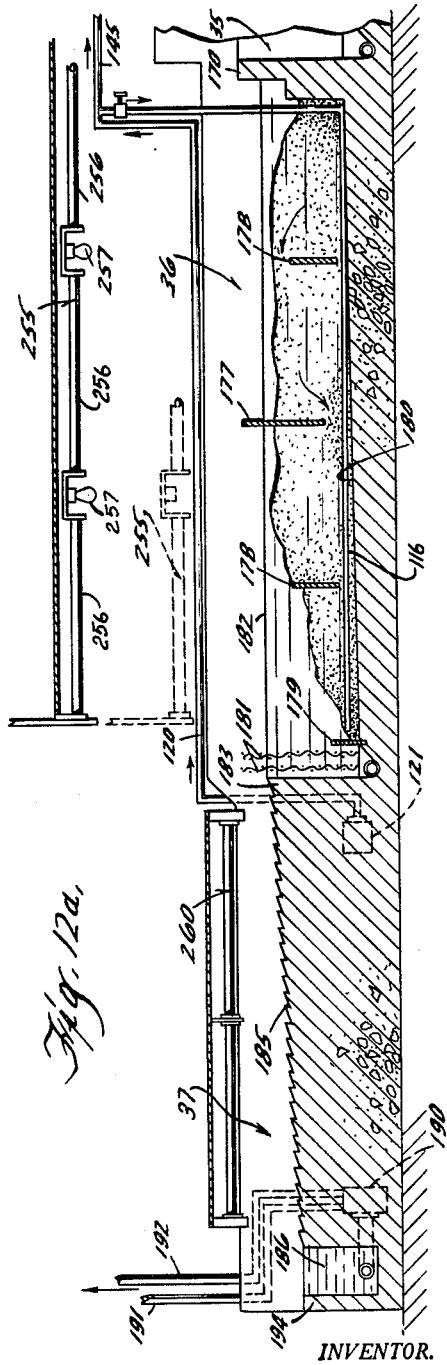

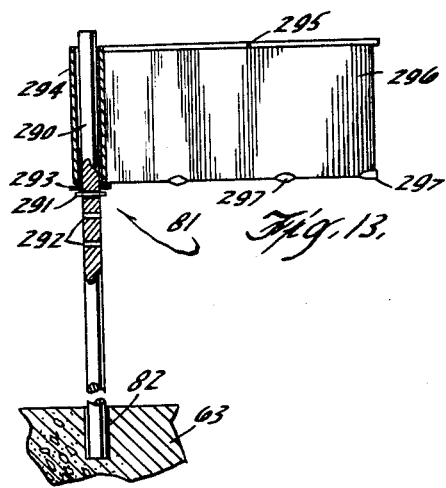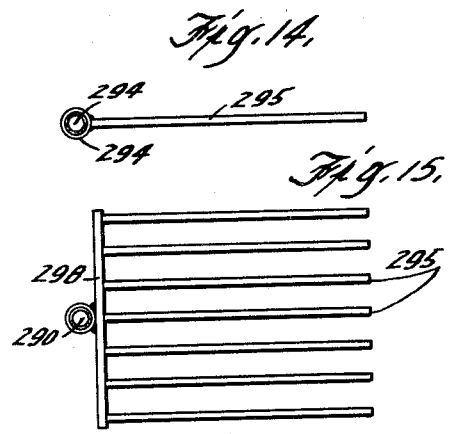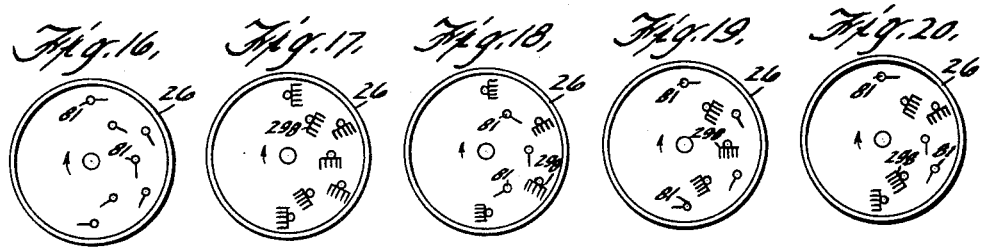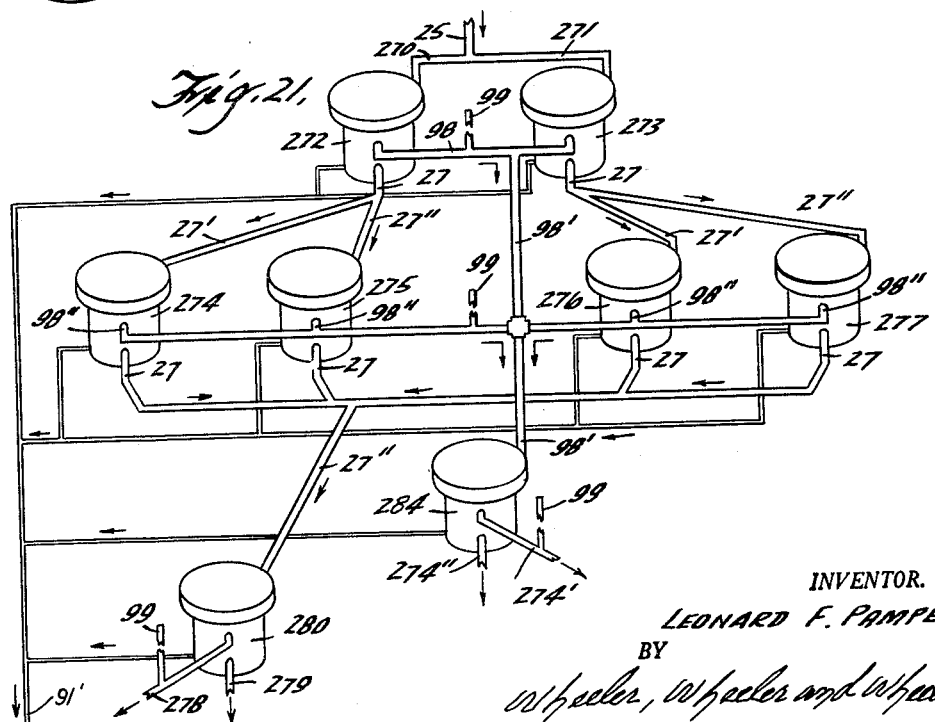

3,155,609
STABILIZATION OF A CLOSED OR OPEN WATER SYSTEM THROUGH THE SELECTIVE UTILIZATION OF LIGHT
Leonard Fredrick Pampel, Hales Corners, Wis.
(8982 S. 77th St., Franklin, Wis.)
Filed May 9, 1960, Ser. No. 27,620
17 Claims. (Cl. 210—3)

My invention relates to the stabilization, biologically, of a closed or open water system through the selective utilization of light.

More particularly stated, my invention relates to the utilization of selected light rays in combination with elements of a closed or open water system whereby even the most pronounced putrefaction producing factors can be mineralized and circulated so as to accomplish such purification that a stabilized biotic community can exist for periods much longer than heretofore considered possible.

In the following specification, reference will be made to a specific utilization of my invention in a zoological environment wherein not only a bird-flight cage community, but also a complete aquarium community was maintained over a period of time with a closed water system under circumstances where putrefaction and malodorous conditions normally, according to previous experience and practices, would have made the system bionomically unacceptable within a week; whereas, in keeping with my invention now to be described, month after month went by without objectionable odors and with a maintenance of a high degree of healthful aquatic environment.

These favorable results were obtained without the addition of quantities of water except such as were required to replace losses due to evaporation.

It has become obvious from the experimental and practical use of my invention that one of the primary deficiencies of previous water systems, processes and apparatus is the failure to properly utilize light. This proper utilization involves not only the selective use of light, but with proper wave lengths to accomplish specific purposes, and also to permit a balance of the end result by permitting the chemical activities induced by the light to be alternated by quiescent periods when direct light application is omitted. While it is my theory that the direct treatment of water and water borne material under light rays of selected characteristics produces photochemical results which continue to be produced after the water leaves the direct irradiation zone, it is my theory that a prolonged period of photochemical activity during darkness is important. It is also my theory that a quiescent period in darkness or substantial darkness is part of this hangover period and of major importance as well as the actual direct irradiation treatment. I hope to be able to prove that certain results of direct radiation of water and water borne material under selective light wave lengths not only produce some direct effects, but also create conditions which may be termed catalytic with respect to chemical and photochemical actions taking place in the water after such water has left a particular direct irradiation zone, but whether or not this theory is borne out, it may be said with positiveness that the closed water system described below actually accomplishes results not heretofore obtainable in water treatment and aquarium practices.

In the following description of my invention, I shall show a closed water system. It will be understood that the system will be effective even if a percentage of water from another source is added to the system continuously or from time to time. However, as will be described below, the operation of my invention in a closed water system tends to stabilize the biologic communities therein.

One of the outstanding features of my invention is the provision of separate pools where biotic communities may establish themselves with beneficial effects upon the entire system. I have found that biotic communities and other environmental factors require biological engineering to associate or separate these communities for special purposes, and that the ultimate result of stabilization may require this. In referring to a stabilized system, I refer to a condition which I found to develop after my invention has been utilized in a closed water system for a period of time, and the various algae, slime, and bacterial communities developed, and at times receded in their development to a point where they provide a balance in the entire system.

Heretofore the utilization of light-in-water treatment systems pertaining to biologic communities has emphasized the use of light in photosynthesis. My invention presents evidence that there is photochemical effect of light which may be utilized for processing and purification of organically polluted water. Furthermore, known sources of illumination, solar or artificial, can be applied to water borne matter so that the radiant energy may be stored for availability later for protoplasmic activity.

This invention demonstrates a microcosm-like control of a closed water system. Proper utilization of light appears as the key factor making possible the establishment of a balance of a biotic community in such a water system. Continuous light applied to the water and water borne material in a portion of a water circuit is balanced by darkness in another portion where continued chemical activity is obviously taking place.

It will also be apparent from the description of my system and apparatus that I have developed a digester comprising an important development for many uses and particularly useful in a system where water borne material includes quantities of solids requiring separation and the water may include elements of different liquid densities requiring special treatment as described below.

In the drawings:

FIGURE 1 is a schematic diagram of a complete closed water system in accord with my invention; culture trays at the right, a main reservoir at the left, and a processed water basin below the area encompassed by the dotted line being shown in offset relation to indicate that they may be laterally remote from the centrally disposed units or may be located above or below.

FIGURE 2 is a wiring diagram and schematic arrangement showing lighting and electrically energized units in the system embodied in my invention.

FIGURE 3 is a plan view of my units within the area encompassed by the dotted lines of FIGURE 1.

FIGURE 4 is a section on line 4—4 of FIGURE 3 and showing certain of the units in elevation.

FIGURE 5 is a view on line 5—5 of FIGURE 4 and showing a culture tray in plan.

FIGURE 6 is a view on line 6—6 of FIGURE 4 and showing an additional culture tray.

FIGURE 7 is a section on line 7—7 of FIGURE 6.

FIGURE 8 is a section on line 8—8 of FIGURE 3 showing the digester and oxidation turbulence zone.

FIGURE 8a is a section on line 8a—8a of FIGURE 3 showing the digester and oxygen turbulence action and photosynthesis and calcium additive zone.

FIGURE 9 is a plan view of the unit shown in FIGURE 8 and comprising the digester and a portion of the oxidation turbulence reactor.

FIGURE 10 is a section on line 10—10 through the calcium treatment zone of FIGURE 3.

FIGURE 11 is an enlarged fragmentary view in vertical section showing the riffle construction representative of the small riffle of FIGURE 8a and also of the larger riffle of FIGURE 12a.

FIGURE 12 is an enlarged vertical section in detail through the right hand portion of the filtration beds of FIGURE 3.

FIGURE 12a is an enlarged vertical section in detail through the left hand portion of the filtration zone of FIGURE 3.

FIGURE 13 is an enlarged detail view in elevation showing a hydraulic velocity dampener for use in the whirlpool basin in the digester shown in FIGURES 8 and 9.

FIGURE 14 is a top plan view of the dampener of FIGURE 13.

FIGURE 15 is a top plan view of an alternative form of hydraulic velocity dampener for use in the digester.

FIGURES 16 through 20 show alternative arrangements of velocity dampeners such as the dampeners shown in FIGURES 9 and 13.

FIGURE 21 is a diagrammatic view showing possible arrangement of digesters where high volume of water or large quantity of water borne solids necessitate great quantitative capacity in the system or greater refinement for specific characteristics such as chemical and physical qualities.

As indicated above, the closed or partially closed water system embodying my invention includes a source of water which will be referred to herein as a main reservoir. From this main reservoir the general course, and the return of the water to the main reservoir follows a path indicated generally in FIGURE 1. A pipe 25 preferably the outflow from the main reservoir is taken at a low level, actually at the bottom of the reservoir. It then passes into a unit 26 referred to in this description as a "digester," the function of which is to remove solid matter, reduce turbidity, and accomplish mineralization of organic wastes. In the lower portion of the digester, means are provided for digestion or removal of heavy solids. Water leaving the digester passes from two different portions of that unit, one pipe 27 taking the water from the upper (whirlpool) portion of that unit and passing it to the oxidation turbulence reactor 28. The other pipe 29 passes water from the digester zone into the oxidation turbulence reactor. Having passed through the reactor 28 and over riffle plate 30 where chemical action of light and germicidal action take place, the water passes into a tank providing a photosynthesis zone at 31. Then, as the water leaves the photosynthesis tank, it passes over riffles at 32 where further photochemical reaction takes place; after which the water passes to calcium treatment tank 33. From calcium treatment tank 33, the main flow of water passes through and over gravel beds divided into coarse gravel in tank 34, pea-sized gravel in tank 35 and No. 30 sand in tank 36 before cascading over riffles at 37 for further light treatment. Then the water passes through pipe 38 to processed water basin 40 which normally would be the low point in the system. Thus far only the course of the main flow of water has been outlined and it is contemplated in accord with my invention that this flow may be by gravity. However, a pump at 41 will return the processed water to the main reservoir through pipe 42 and this may be considered as a part of the main flow. Calcium treated water from tank 33 is passed through pump 45 through pipe 46 to the upper level of unit 26 where this calcium treated water has a part in the treating of the water coming to the unit from the main reservoir. Also, pump 45 supplies calcium treated water through pipe 47 and branch lines 48 and 49 to culture tray 50, and from there through pipe 51 to coarse gravel bed at 34. The calcium treated water fed through pipe 49 is supplied to tray 52 and from this tray the water passes through pipe 53 to the coarse gravel bed.

It will be seen in FIGURE 1 that a pump at 55 passes processed water from the lower end of the riffle 37 through pipe 56 to culture trays at 57 and 58 respectively. The flow from these trays passes to tray 50 or 52 as will be described below.

Main Reservoir

The main reservoir as shown in FIGURE 1 is initially supplied with water which may comprise city tap water or reasonably "pure" water from almost any source. If the water is chlorinated, then a period of aeration for dispatch of the chlorine is required before the circulation through this system is started. In a particular experimental aquarium environment, city water from the mains in Milwaukee, Wisconsin, fairly heavily chlorinated and fluoridated was used. The pH was 7.4 when the water was introduced. This experimental main reservoir comprised a portion of a basic aquarium over which a flight cage for bird life was maintained in a zoo. The main reservoir was 28 feet by 100 feet, and the depth of the water from 0 to 42 inches (although in this experimental system, a waterfall occupied part of the area of the main reservoir). Furthermore, there were three culture tanks and a stream bed which were under continuous special illumination.

The main reservoir held 29,000 gallons of the total 34,000 gallons in the system. In that experimental system, the main reservoir maintained a biotic community including the following:

Varieties of 44 aquatic birds ranging from pelicans, to water ducks.
In the water itself, there were 100 pounds of game and rough fish, 25 pounds of minnows (lake shiners), 30 pounds of turtles.
There were frogs, tadpoles, mud puppies, and crayfish totaling approximately six pounds, and a few fresh water clams.

Adequate food for all of this biotic community was provided daily; for instance, a daily supply would include a 10 quart bucket of lettuce and 3 pounds of grain mash and 1 pound of ground horse meat, a 10 quart bucket of frozen smelt, 3 pints of dried flies and 1 loaf of bread.

For a clear understanding of the effectiveness of the system described below, it is explained here that with no use of antibiotics, no purification agents, no bloom inhibitors, and only a moderate removal of solids in the system now to be described as a closed water system, the water has been maintained in odorless, nonturbulent and non-toxic condition as demonstrated by the fact that rainbow trout lived and thrived in good health in this aquarium.

At the close of 14 months' experimentation, the pH of the water in the reservoir was 6.8. Contrasted with the favorable results just referred to, it is noteworthy that prior to the inauguration of the principles of the present invention, as applied to an aquatic bird exhibit of comparable size (without fish in the reservoir), it had been necessary, even where a fresh supply of city tap water was constantly being injected into the system, to flush and clean the entire flight cage community at one week intervals because highly objectionable odors and accumulations of putrefying food stuffs and offal would otherwise be completely objectionable. Conditions required that proper applications of copper sulfate be used to control algae and slimes in the flight cage tank. At that time the water in the reservoir would not support fish life.

It is also noteworthy that through the exercise of the principles of the present invention not only is fish life maintained successfully, but there are many evidences of water "purity." For instance, bird feathers and other debris is mineralized and with no water-borne evidences of putrefaction.

Digester

Water passing from the main reservoir into the system shown within dotted lines in FIGURE 1 physically carries the debris and contamination which may result from the particular water community prevailing in or over the main reservoir. The digester located as shown in FIGURES 3 and 4 performs the function of mixing, aeration, chemical treatment, coagulation, and eventual precipitation of the solid and water borne substances.

Unit 26 is made up of two principal hopper-like chambers, 60 and 61, as shown most clearly in FIGURE 8. Chamber 60 is funnel-shaped with an upstanding rim 62 and a tapered "floor" 63 terminating at a lower outlet at 64. The upstanding rim 62 of this upper chamber 60 provides a mounting means for a bridge 65 equipped with peripheral bracket fingers 66 receivable in embracing relation to the upper margin of the chamber so that a central bearing hub 67 carried by the bridge is in position to support a number of revoluble sweep arms 68 adapted to carry a number of angularly adjustable baffle 69–70 of suitable size and shape so that water entering the chamber through pipe 46 from pump 45 will set up a whirlpool and will be affected by the position and shape of the baffles.

In addition to the baffles 69–70, there are supported in chamber 60 a number of cylindrical screens 75, 76, 77 and 78 extending from above the water line 80 to somewhat above the sloping floor 63 of the chamber. Also extending upwardly out of sockets in the lower floor 63 of chamber 60 are velocity dampeners 81 somewhat flag-shaped in general configuration and having staffs vertically positioned in the sockets such as 82. All of this equipment carries out the various functions listed above.

Below the funnel-shaped chamber 60 in position to receive water and water borne material passing through the bottom outlet 64 is chamber 61, the bottom 85 of which is downwardly tapered to a sludge outlet 86 and the side walls of which at 87 are vertical and of such upward extent as to provide room for a cylindrical baffle at 88 to prevent formation of high velocity currents. At 89 a water tight manhole cover closes a port 90 which may be used to give access to this lower chamber in the event of unusual accumulations of solids not readily removable on a flush-out basis through the outlet at 86 through valve 91 and waste pipe 91'. This is a maintenance operation only resorted to at intervals.

From the above description, it will be realized that water from the reservoir entering chamber 60 through pipe 25 and calcium bearing treatment water entering this chamber through pipe 46 from pump 45 will progress through the chamber in the whirlpool action referred to above, and when it has been acted upon by baffles 69–70, by cylindrical screens 75–78, and by velocity dampeners 81, will reach outlet pipe 95 so positioned as to prescribe the water level at 80. Water passing out of the outlet pipe 95 proceeds through pipe 27 and valve 96 into oxidation turbulence reactor 28.

As will be described below in greater detail, accumulation upon the cylindrical screens 75–78 provides a bacteriological sedimentation from water flowing through the screens. These screens are self-cleansing in the sense that they tend to build up to a certain point and then by gravity, the accumulations slough off and the solids drop through the outlet at 64 into chamber 61 where bacteria act upon the accumulations with well-known biological processes.

Accumulations of gases naturally following from the biologic decomposition referred to above pass through openings at 97 and through pipe 98 to a vent pipe 99 which extends above the level 80 in chamber 60. Water which passes through the outlet 64 in the bottom of chamber 60 finds its escape by gravity through pipe 98 and through pipe 100. The quantitive relation of the water escape from the chamber 61 in relation to that from chamber 60 is regulated by valve 101, it being understood that the total outflow from unit 26 is accommodated through pipe 27 or pipe 100 and all of it flows into the oxidation turbulence reactor now to be described.

Oxidation Turbulence Reactor

It is believed that light, sunlight or artificial, may be beneficial to the action in chamber 60, but no special reasons to provide such light or to exclude it have thus far become evident. At 110 (see FIG. 8a) there is an oxidation turbulence reactor comprising a chamber into which pipes 27 and 29 deliver the outlet water from the respective chambers of unit 26. Just inside the wall of this chamber 110 and in position to act as baffles to prevent any rush of water from imposing too great stress upon the equipment in the chamber, are baffles 111 and 112. For reasons explained below, baffle 112 has a floor at 113 to prevent the current of water from pipe 27 agitating any sediment from the floor. At intervals in chamber 110, there are flat screens 115 vertically disposed and extending from a point above the water level to just above a set of aeration pipes 116 as shown in FIGURE 8a. Air under pressure is supplied to these aeration pipes 116 which are perforated along their lengths and provide treatment of accumulated material on these screens. Here, too, the screens are self-cleaning. The supply pipe for air under pressure to these pipes 116 is shown at 120. The air compressor for this supply is shown in FIGURE 2 at 121.

Any accumulation of sediment at the bottom of chamber 110 is removable through drain outlet 124, but this drain is only opened manually as required for delivery of excess accumulations of waste, and the water level in chamber 110 is maintained by a riffle dam 125 supported by wall 126, forming a partition between chamber 110 and tank 130.

Photosynthetic Process Tank

Tank 130 is an elongated treatment zone and one end wall 126 of this tank has already been described. The other end 131 provides an end partition to support another riffle dam 132. The floor of tank 130 is a downwardly sloping surface 133 terminating at the base of partition 131 in an accumulations trough with delivery pipe 134; it being understood that the water which fills tank 130 between the riffles 125 and 132 respectively is relatively clear water providing relatively small amounts of precipitated sediment.

At spaced points along the tank 130 there are screens 135, 136, 137, 138, 139, 140, 141 and 142. All of these extend to a point very closely adjacent the sloping floor 133. They provide laterally complete screen barriers. To prevent actual overflow of surface flotation solids, a depending plate 143 extends completely across the tank 130 and extends from the top margin of the tank down deeply into the water. From this description it will be apparent that the water level in tank 130 is maintained by the riffle dam 131–132 and the water flowing over the riffle 132 is delivered to a calcium treatment zone. An air pressure supply pipe 145 comprising an extension of the pipe 120 is connected to aeration agitation pipes 146.

Calcium Treatment Tank

At the end of the structure shown in FIG. 8a there is a tank 33 to receive the water delivered by riffle 132. This tank lies between partition 131 and the end wall 150 and I provide between the side walls of this tank 33 and below the established water level therein, a grid 151 (see FIGS. 8a and 10) sufficiently strong to support a bed of crushed lime stone or other source of calcium carbonate. This tank 33 as well as tank 130 is supplied with aeration pipes 116, 124 to aerate and agitate the mix. I thus assure that the water picks up the calcium for reasons described below. Outflow from tank 33 is by gravity over the relatively low level wall at 155 and the water is delivered into the apparatus shown in FIGURE 12.

The water in the calcium treatment tank 33 is maintained (see FIG. 12) at 160 by the low wall 161 over the top of which the water from the calcium treatment tank flows in its passage to the coarse gravel bed tank 34.

Set into this wall and extending horizontally above the level of the water in tank 34, there is a water distributor baffle and screen 162. This perforated tray 162 also performs a distribution function with respect to water supplied to it from culture tanks (see FIGURES 5, 6 and 7) as will be described below.

The tank 34, as shown clearly in FIGURE 12 has a sloping bottom 163 along which are arranged perforated air pressure pipes 116 connected to the same air pressure supply pipe 145 which has been referred to above, and tank 34 has a wall 165 at its outlet end which is a few inches lower than the top of the wall at 160. As seen in FIGURE 12, the gravel bed is retained, toward the outlet end of tank 34, by a pair of restraining baffles 166 and 167. These are perforated plate-like baffles 166 extending from above the water line to a lower margin spaced upwardly from the bottom of the tank, and 167 extending from a height approximating the lower margin of plate 166, down into the bottom of the tank so that the heavy gravel is retained as shown in the drawing, and the water is permitted to pass through the bedded gravel down under baffle 166 and over the top of baffle 167. The top of baffle 166 even though it extends above the water line determined by the height of wall 165 must not be quite as high as the top of wall 155. Then between baffle 167 and the end wall 165 of tank 34, there are a plurality of screens 168 having a mesh comparable to housefly screening and made of plastic material. Water passing over the wall 165 enters tank 35 and is retained therein at a lower level determined by the height of wall 170 at the outlet end of tank 35 the tank having a supply of pea-sized gravel held against forward travel by a series of baffles 171 extending from above water level to a point above the bottom 172 of the tank, baffles 173 which are at an intermediate depth, and baffle 175 near the end of the tank and extending up from the bottom of the tank as shown in FIGURE 12. In this tank also, there are a plurality of screens at 176 to screen the water immediately preceding its passage over the wall 170.

Then as the water passes over the wall 170, it is received in tank 36, as shown in FIGURE 12a, provided with baffles as shown at 177 and 178 respectively, plus the low baffle 179 near the outlet end of the tank. The baffles 178 are intermediate height baffles and baffle 179 extends into the bottom 180. Screens at 181 extend from the bottom of the tank to a point above the water level at 182 which is determined by the end wall 183 of tank 36.

End wall 183 is a part of an extensive riffle construction at 185 (see FIGURE 12a), and when the water leaving tank 36 has passed over riffle 185, it is accumulated in a riffle basin 186. Part of this water is pumped out by pump 190 for culture tank utilization and for that purpose it is passed through the two pipes shown at 191 and 192, respectively. The bulk of the water overflows wall 194 and passes into processed water basin 40, which is at the lowest level in the system if the system is to be maintained as a gravity system and out of this basin a large capacity pump 41 passes the water to the main reservoir which is the highest level.

In referring to a large capacity pump, it may be surprising to note that in the flight cage and aquarium combination described above as having total capacity of 34,000 gallons, it was only necessary to circulate through the "large" pump approximately 640 gallons per hour in continuous flow.

Culture Tanks

In any adaptation of my water system for particular end uses of the water, the water as it has been treated to a certain degree of chemical or biologic processing is diverted from the general stream which has been discussed thus far in this description and may be conducted to a particular tank, tray or bed pertaining to the end use desired. In this description, I shall refer to these as culture tanks. For the purposes of this disclosure, they are shown in position, one above the other in the central part of the diagrammatic arrangement of FIGURE 1 within the dotted line.

In FIGURE 4, disposed at the highest level is culture tank 200 supported above culture tank 210 by struts 201, and 203. Each of the tanks 200 and 210 (and there may be others) may be designed for specific purposes, but in a particular installation where tank 200 was used as a plant culture and growth area, the tank was 3 to 5 inches deep and tank 210 is of the same depth. The total area of the respective tanks is, of course, suited to the particular requirement.

Reference has already been made that pump 190 pumps water from riffle basin 186 through pipes 191 and 192. As shown in FIGURE 4, pipe 191 is arranged to deliver water to tank 200, and pipe 192 delivers water to tank 210. Each of the tanks 200 or 210 is provided with a cross partition or a dam 211 to divide the tank into areas having different depths of water (see FIGURE 7). One wall of each of the tanks 200 or 210 is of lower height so as to provide an overflow outlet for the tank. In FIGURE 4, this wall of each of the tanks is at the right, and tank 200 has a screen curtain 212 down and over which the water may cascade as it is passed to tray 162. As to tank 210, a similar screen 213 likewise passes the overflow water to this same tray 162 for ultimate delivery to tank 34.

Now that the tanks 200 and 210 have been identified and described as shown in FIGURES 4, 5, 6, and 7 it will clarify previous statements regarding circulation of calcium treated water to note that the pump 45 for removal of some of the calcium treated water from tank 33 passes water through pipe 47 and pipes 48 and 49 to the tanks 200 and 210 as shown in FIGURE 7, one of these calcium water supply pipes delivering treated water at the surface of the water in the respective tank.

Light Ray and Electrification Equipment

FIGURE 2 illustrates diagrammatically the wiring for the energization of the electrical equipment. The typical 220 volt three phase supply as shown in the wires 220, 221 and 222. Certain pumps have already been referred to. The largest of these is pump 41, the wiring for which at 223 is under control of a suitable starter switch 225 controlled by a float operated micro switch 226 is position to react to the level of water in the processed water basin 40. Whenever the circuit energizing the motor 223 is closed a circuit including wires 227 is likewise energized so as to open solenoid valve 228 in pipe 25.

Another pump previously referred to is the pump 55 for the pumping of processed water to the trays 200 and 210. The motor 230 for this pump 55 is controlled by a switch 231. This in turn is controlled by float controlled microswitch 232 the float for which is on the surface of the water at the delivery end of the riffle 37.

Another pump is pump 45, the motor 235 of which is energized by circuit controlled by a switch at 236, with a float 237 in response to the water in calcium tank 33.

The last pump is air pressure pump 121 the motor for which at 240 is controlled by a circuit including switch 241 which is a manually controlled switch.

The remainder of electric circuitry relates to the energization of various sources of incandescent light, ultraviolet light, black light, fluorescent gold and white light specific provision for which is made with respect to certain of the tanks and riffles as will now be described.

Over the riffle 30 in position to cause photochemical reaction with respect to the water and water content passing from the oxidation turbulence reactor 28 to the tank providing a photosynthesis zone at 31 is a source 245 (see FIG. 8a) of ultraviolet light having a wave length range of 2,500 to 3,000 A. This source of light is in the same circuit with a source 246 (see FIGS. 8a and 10) providing black light to the water and water content passing over riffle 32, and there is a manual switch at 247 to control this circuit. Also, in a portion to be energized as switch 247 is closed there is a source 250 (see FIG. 8a) of fluorescent and incandescent light bu the fluorescent light is energized concomitantly with closure of switch 247, by closure of switch 251.

Over the filter beds 34, 35 and 36 there are sources of incandescent and fluorescent light aranged under a hood shown diagrammatically at 255 (see FIG. 12) the various light elements being gold and white fluorescent 256, and incandescent 257. These lights are shown in the diagrammatically represented circuit under control of manual switch 258 (see FIG. 2) and if desired the incandescent lights may be provided with separate control circuits having manual switch 259.

Over riffle tank 37 (see FIG. 12a) there is a source 260 of black light (3,600 A). This is under control of a manual switch 261.

The culture trays 200 and 210 respectively are under light sources 265 and 266 (see FIG. 4) providing fluorescent gold and white light and incandescent light as indicated in FIG. 2.

Multiple Digester

Under certain circumstances where a single digester is relatively inadequate to handle the larger quantities of solids or special types of solids requiring more refining and digesting, several digesters either in parallel or in series may be useful. Likewise larger volumes of water may require that several digesters may be used. FIG. 21 shows the usual pipe 25 from the main reservoir passing through a digester line 270, 271 to the whirlpool portion 60 of each of the digesters 26 at 272, 273. Then the outlet from the two parallel digester chambers 61 will pass through a pipe 98 to a common delivery pipe 98' to the whirlpool portion of a terminal digester 274. It will be understood that this outflow from the digesters 272 and 273 comes from the upper portion of the lower chamber 61 of the digester as shown in FIG. 8.

Out of the whirlpool portion of each of the digesters 272 and 273 the delivery pipe 27 (see FIG. 21) from digester 272 extends through 27' and 27" to the whirlpool portions 60 of 2 digesters 274, 275. Similar pipe connections extend from digester 273 to whirlpool basins 60 of digesters 276 and 277 respectively. These digesters provide additional digester treatment for the whirlpool outflow from the digesters 272 and 273 and when the digesters 274–277 have performed their function to give further treatment to this water the portion containing the smallest amount of solids from digester compartment 61 will pass out of these four digesters through outlet 98" and passage to pipe 98' and then to terminal digester 274. Those portions of the output from digesters 274–277 leaving the various pipes 27 as shown at 27" lead the effluent to terminal digester 280. The outflow from chamber 61 of the digester 280 at 278 may be considered as reclaimed water. The outflow from chamber 60 of digester 280 at 279 is delivered to the oxidation turbulence reactor 28. Similarly the outflow from chamber 61 of digester 274 will be passed through pipe 274' to the main reservoir. The outflow from chamber 60 of this digester will be delivered through pipe 274" as reclaimed water.

Curent Velocity Dampeners in the Whirlpool of the Digester

References have already been made to the current velocity dampeners 81 (FIGURE 8). In FIGURES 13 and 14 I have set forth in detail the flag-like characteristics of these devices. There is a staff 290 adapted to be fitted into one of the sockets 82 in the sloping bottom of the whirlpool chamber 60. At 291 there is a depth adjusting key receivable in any one of a number of detent apertures at 92. Then in position to bear upon the depth adjusting key in any position in which it is set relative to staff 290 there is a floating washer 293 to act as a thrust bearing to receive the pressure of a sleeve 294 having such diameter as to freely receive the staff 290. It is upon this sleeve 294 that an arm 295 is mounted so as to provide a support for a sheet 296 of material suitable for long life in water and providing a reluctance to travel of water over its surface. Suitable weights at 297 at separate points along the lower margin of the polyethylene sheet assure that the sheet will tend to maintain a vertical, even though rippling, condition. These velocity dampeners slow down the whirlpool action of this water entering the digester through pipes 25 and 46.

In FIG. 15 I have shown a mounting on a staff 290 of a multiple of polyethylene sheets carried by a transversely positioned arm 298 for use where conditions call for reduction of current speed in the event of high pressure delivery of water into a digester.

FIGS. 16–20 inclusive show somewhat diagrammatically a variety of arrangements of velocity dampeners; it being understood that these dampeners are positioned not only in the outer portions of whirlpool chamber 60 but also below the cylindrical screens. In mentioning polyethylene as the material for the flag-like dampeners, it will be understood that other materials may serve equally well.

The cylindrical screens may be supported in any suitable mechanical manner, as for instance by rods (not shown) extending from wall to wall across the chamber below the path of travel of the baffles carried by the sweep arms 68.

Operation of the System

Probably no problem in water purification and maintenance of healtful conditions in a biotic community could exceed the problem which had prevailed in the flight cage referred to above. There the birds lived above a "lake" equipped with simulated rocky conditions, a waterfall, and a concrete and rock island. Food materials as described above were distributed in the water and on the island. Bird manure accumulated rapidly, and the waste food decayed in quantities, despite constant drainage of water from the lake and replenishment in the form of potable tap water constantly supplied over the waterfall. Natural sunlight in daytime, through an overall skylight, and darkness at night constituted the light and irradiation conditions. Before the weekly complete drainage of the lake and virtual scrub down of the entire above and below water surfaces, the accumulations and odors were very objectionable.

Upon institution of the principles of my invtntion, the supply of tap water was shut off. The "lake" became the main reservoir shown in FIGURE 1 of the drawings. In a series of tanks surrounding two adjacent sides of the lake the various units included within the dotted line of FIGURE 1 were established. Culture tanks, the light sources, and a stream circuit were set up to put the invention under test. The only elements not included were those identified as a digester, and for a portion of that function, a manual remover of solids from the main reservoir was resorted to.

Into this closed water system in addition to the bird community there were added natural entities imported from neighboring streams. These included microorganisms, both plant and animal, and a truly general selection was made, plus the fish life specified above.

Immediately the biotic community took on a healthful atmosphere. The water of the main reservoir into which the manure of the birds and the surplus food was washed and sluiced by hoses, using only the water from the closed system, remained acceptably nonturbid and substantially non-odorous even though the removal of some solids from the bottom of the reservoir at long intervals (7 months after first establishment; monthly thereafter) would have been expected to provide an odorous result.

As indicated above, the water of the main reservoir and the water being returned by pump 45 from tank 33 enters whirlpool basin 60 of the digester 26. The water coming from tank 33 is aerated and increases the efficiency of the oxidation of organic wastes in the whirlpool basin. Also, because of the calcium content of this water from tank 33, the assistance of this water in the digester process is effective in controlling pH and in conditioning the water in well-known ways relative to plant and animal physiology. The buffering action of this calcium bearing water and its general influence in accord with previously known biotic purification processes in natural waters contributes to the efficiency of the elimination of pollution in the water coming from the main reservoir. Furthermore, this water from tank 33 not only induces extracellular products of algae and slime communities produced in the photosynthetic zone 31, but provides a range of photochemical products which are beneficial to the purification process which takes place in the whirlpool basin. This water is in a radiant excited state because of its immediately preceding treatment as it has passed over the riffles 30 and 32 and under the lights of the photosynthetic zone 31. Enzymes produced by the living organisms in the photosynthetic zone 31 are immediately available in the digester and it is my theory that photochemical production of vitamins or vitamin like substances under the light sources 245, 246 and 250 are made most effective by their continuous introduction into the digester.

Within the chamber 60 of the digester, the plastic screen cylinders tend to filter the water through the slime community matter that is established on these screens. Water turbidity and organic coloration is reduced in the whirlpool basin by this action. Also, there is a blending of the water from tank 33 and from the main reservoir in such a way as to provide maximum coagulation as a result of which substantial sedimentation of heavy materials is accomplished, and if there is some expected development of gases so as to cause surface flotation, this is broken up by those baffles 69–70 carried by the sweep arms 68.

The design of the whirlpool with its special equipment provides means for separating the clear non-turbid water with light density liquids and passing these out of the chamber 60 through the outlet pipe 95, whereas the turbid heavy density portion of the water is slowed down sufficiently to precipitate and be carried out by slow water currents or by gravity so that delivery of this material through outlet 64 into chamber 61 is accomplished.

Chamber 61 below the whirlpool chamber 60 may be called a sludge decomposition chamber. Since the main outlet of this chamber is at 98, the cylindrical baffle 88 tends to prevent a development of a high velocity current between the opening at 64 and such outlet 98. However, this baffle extends only part way to the conical bottom 85 of chamber 61, and there is a considerable capacity for sludge deposits. Aerobic processing of sludge takes place in chamber 61. Anaerobic activity would be limited to the somewhat compacted and immobile sludge next to the digester bottom. Those wastes which are not mineralized remain at the bottom of chamber 61 without stagnating the water in the general system. Any gases which develop are released to the atmosphere through pipe 99, and bacterial action is maintained in an optimum environment due to the continuous flow of water to the digester and as may be expected, the calcium treated water which came from tank 33 helps to maintain valuable environmental conditions in the sludge decomposition chamber 61 for the same reasons as discussed in relation to the process carried on in the whirlpool basin.

It is in the oxidation turbulence reactor 28 that the water flowing from the digester 26 through pipes 27 and 100 is thoroughly blended by the intense aeration and screen filter operation. I here provide for maximum oxidation of any water borne substances either organic or inorganic, with resultant removal of hydrogen sulfide, ammonia, or other gases, if present, and the removal of sludge may be precipitated in this zone. Colloidal substances which may have been carried over from the digester may require treatment here where the slime communities may be deposited on the plastic screens and contribute to the processing of the organic substances in readiness for the irradiation which is immediately to follow.

As the water passes over riffle 125 of the characteristics set forth in FIGURE 11, the full effect of the irradiation from the light sources at 245 accomplishes their purpose. This riffle is designed to permit a thin sheet of water to pass over the slanted echelon of this surface so that maximum turbulence and gas exchange is augmented in the water medium. In this way, water borne substances, as they pass through the irradiated field, are frequently surfaced to the full intensity of light radiation. I assure by this mechanical and hydraulic arrangement a most effective irradiation since ultraviolet rays can be effectually diminished by water color or turbidity. The resulting germicidal reaction of this ultraviolet radiation in the 2500 to 3000 Angstrom range has been known to be effective and the beneficial substances and water borne material remain for active and favorable development and treatment in the subsequent operation of my system. Pathogenic organisms are made ineffective and it will be understood that the water and water borne material leaving the zone at 30 carries with it and stores radiant energy at the atomic and molecular level of matter in readiness for favorable photoplasmic activity later in the system.

In fact, this field of radiation at this particular location in the closed system shown in FIGURE 1 is believed to be unique in development of a balanced ecology associated with a water purification system and a diversified biotic community.

It is demonstrable that absence of light from source 245 and the other light sources described would notably reduce the efficiency of my system so that maintenance of an approximation to neutral pH would not be realized; and my theory is that one or a combination of the following factors that are related to the ionization of the water medium may explain the success of my system:

(1) Chemical action resulting from ultraviolet radiation of the water borne material.
(2) Increased processing efficiency of microorganisms.
(3) Utilization of photosynthesis over the complete 24 hour day.
(4) Photochemical reaction.

These items may be important, because the wave lengths which I use are shorter and more intense than those prevalent in natural culture beds and water systems. This is augmented by the benefits flowing from the use of gold fluorescent light which penetrates water to marked degree and is conducive to photosynthesis.

The zone of photosynthesis at 31 provides a process step in water purification which is well known and probably requires no special explanation except that it is deliberately biologically engineered to serve its well known function immediately following the ultraviolet light treatment at the riffle 125. Certain algae and slime community activities are concentrated in this zone 31 and an environment heavily charged with dead bacteria and the end productions of the biological process that have taken place in the digester 26 as affected by the oxidation turbulence reactor. Blue-green algae in this zone would be expected to remove hydrogen sulfide and ammonia from the zone.

It will be understood that the plastic screens 136–142 and the platelike baffle 143 are positioned to prevent most of the water borne solids from flowing over the riffle at 132.

At the black light riffle 132, receiving its light radiation from the sources at 246, germicidal action is minimal at 3600 angstroms but other photochemical action takes place with respect to water borne material produced in the photosynthesis area.

Special note should be taken of the fact that the light radiation over riffle 125, over photosynthesis tank 31, and over riffle 132 is continuous.

The calcium treatment tank treats the water in many well known ways but it has special significance because it not only serves to treat the water at this particular point in the closed water system but also provides through pump 45 a calcium treated water additive which is so important in the operation of the digester 26. Quantitatively the amount of calcium used up in the operation of the experimental closed water system referred to above has been the subject of much study. Three cubic yards of crushed limestone in tank 33 was found to serve the purpose of the 34,000 gallon closed system over a period of a year. It is therefore reasonable to deduce that as the algae and other biotic communities changed in location and development from time to time as above set forth the calcium utilization at various locations in the system responsively changed.

The efficient interaction of the water with the limestone in this tank may logically be another important fact related to the phenomenal balancing of pH to that of pH 7 in this new water system.

The filter bed portion of the system 34–35–36 while probably conventional in its general purpose has features of improvement provided in the provisions for lateral and longitudinal flow of the water through the filter medium instead of the usual vertical flow system common to the water treatment field. The new arrangement in combination with the aeration facilities in the filter beds makes possible the actual "backwash" at any time that the aeration pressure supply is increased so as to promote lateral and longitudinal movement of the water. Furthermore, continuous moderate aeration stimulates microorganism growth through the entire bed rather than in the surface portion only.

The continuous illumination field over reach of the beds 35–36 permits the mat like formation of microorganisms on the surface of these beds but the graduation of gravel in the first bed to sand in the last bed assures that the sand is at the outlet end of these beds and the tendency to clog is reduced.

The large riffle 185 in tank 37 (see FIG. 12a) with its source of light at 260 provides for delivery of the processed water into basin 40 under the most optimum condition in readiness for transfer to the main reservoir. It is the main purpose of this treatment to obtain the chemical action of light in this light range but it is obvious from the description that oxygen, $CO_2$ or other gas exchange between the water and the atmosphere takes place at this riffle 185.

It now becomes apparent how the water in the main reservoir, for instance, the main "lake" in the experimental aquarium and flight cage setting referred to several times above permits extraordinary overloading of the water and the main reservoir with material which would heretofore have veen considered sufficient to break down the system but under the utilization of the instant invention the conditions healthful for the equilibrium of ecological complicated biotic communities can be maintained.

The cultures in the culture tanks are for utilization of excess nutrients and for removal, by cropping, of excess water borne substances.

This is a process zone for photosynthesis. This zone provides for the removal of soluble substances in the water in substantial amounts. This is accomplished through the culture of both terrestrial and aquatic plants, which are cropped or thinned out as required.

Water is pumped from riffle basin 186 to culture tanks 57–58. This water has a quality that is favorable to the hydroponic culture of terrestrial plants. The water in these tanks has been adequately purified and lacks fungus or mould potentials. This culture area has been proved to be desirable for the mass culture of water cress. The excellent production of oats, that have been hydroponically cultured using this process system principle, indicates that the procedure is a very practical and efficient operation. This culture zone increases the range of exploitation of the closed water processing system beyond the confines of the main reservoir which would likely be the only zone of water utilization in other known biological purification systems.

The water flowing from tank 50 and 52 drops along the plastic screens 212 and 213 respectively. This screen surface provides an area of rapid water evaporation and would have some consequence to maintain temperature of the water by cooling in summer and heating in winter (under known conditions that would prompt this heat exchange). The screen falls also prevent splashing and provide surface area for microorganisms to adhere to. This screen is so placed in the overflow area of the tanks as to prevent the overflow of surface flotation from the tanks.

It has been my observation that some water borne substances tend to develop to excess and that living organisms develop to feed upon such excess. Therefore from time to time new colonies appear, or old colonies disappear or suddenly show evidence of change, for instance in color. The provision of culture tanks equipped with continuous light sources as shown in the drawings provides special zones for development of these colonies to the betterment of the entire system. In a particular system a hydroponic farm may be established comprising culture tanks where particular nutrients are available.

It is one of the remarkable results of my system that the culture tank and its continuous light localizes algae growth in this lighted environment with the result that algae bloom and development in the main reservoir was minimized. Also noteworthy is the fact that when increased organic pollution of my system is deliberately provided, the blue-green slime algaes reproduced rapidly in the culture tanks and fed upon these nutrients. After several days, when pollution nutrients diminished, these blue-green algae disintegrated and filamentous green algae became dominant. The disintegrated blue-green algae accumulated against the screens and sloughed off. Later such material was found to have been mineralized or stored as an inert sludge.

This is contrary to heretofore expected results in that the usual experience has been the development of noxious and water stagnating conditions. Fourteen months of deliberate experimental pollution overload of my system did not reduce the pH of my system below pH 6.8. The city tap water as originally put into my closed system was pH 7.4.

My reason for delivery of culture tank outflow water to the filter beds is that this water shows evidence of special properties conducive to the development of microorganisms valuable in the filter bed.

While greatest attention has been directed above to a closed water system, primarily because the merits of the invention as applied to such a system are dramatic and unencumbered by extraneous factors, it is a fact that this invention is useful in a water system such as a fish hatchery where water from my processed water basin would be fed to the hatchery tanks or pools and an equivalent quantity from the outlet of the hatchery reservoir would be fed into my system either at my main reservoir or, preferably into my digester. Under such circumstances, the fish would be benefitted under all conditions and would survive even a period of drought when the natural sources of water for the hatchery dwindled below the usual survival minimum for standard hatchery operations.

In ths description of my system, reference has been made to "screens," for instance, the cylindrical screens in the digester 26. I have found that a standard window or "fly" screen provides the mesh best suited to all of the screen purposes which have been identified herein. The material of such screens could be of any material inert in the water of the system, but I have found fibre glass or plastic very well suited to the purposes which generally include ability to form a surface upon which microorganisms can thrive, ability to screen out solids, and ability to reduce current velocities. In effect these screens perform in some of the locations a wide expansion of the surface area sometimes found in gravel beds in natural streams. Obviously if water in a particular system carries fibrous or flocculent material that would clog the smaller mesh screen then a larger spacing of screen mesh material may be desirable.

As a further indication that a fundamental improvement in water treatment in a closed water system is provided by my invention, I call attention to the fact that in the operation of hydroponic farms and other efforts to produce vegetation when root structure is continuously immersed in water there has been a strong tendency toward root disintegration and only partial success in maintaining healthy, green growth throughout the length of the plant. In contrast to this, I call attention to the fact that vegetation grown in my culture tanks on a horizontal plastic screen so positioned that root structure of the particular crop was continuously immersed in water, the crop showed continuous uninterrupted healthy progress in its growth and good chlorophyl development, and the rate of growth would average an inch per day under the gold and white fluorescent, plus incandescent light of my culture tray. The eighteen inch growth in eighteen days starting from germinated seed condition on the first day is positive indication of the unprecedented success of my water treatment as set forth schematically in FIGURE 1.

Purely as a matter of "maintenance" in the day to day operation of a closed system operated in accord with my disclosure, it will be seen that in view of the use of pump 41 to draw off the processed water and supply it to the main reservoir, any shortage of water will be evident here. The processed water basin in a gravity system is the lowest portion of that system and logically any shortage of water which may develop will be noticed at the processed water basin location. Therefore, any means manual or otherwise to reestablish the level of water in the processed water basin, possibly through the use of a float controlled valve, may restore in the system, any water lost through evaporation.

When the digester shown principally in FIGURES 8 and 9 was added so as to complete the system shown in FIGURE 1, a unique pattern of organized water purification processes, biologically engineered, was established so as to provide a flowing closed water circuit with adaptability to the greatest diversification of biotic community interrelations. I have found that this system provides a maximum range of ecological factors in a minimum area of water.

I claim:

1. A water system having a reservoir connected in a closed main stream circuit having in the following order, a digester, an oxidation turbulence reactor, a photosynthetic process tank, a calcium treatment tank, said system further having a plurality of riffles each provided with a superposed light source; one of said riffles having a superposed light source providing ultra-violet light wave length range below 300 angstroms and another of said riffles having a continuous source of natural light, and means for directing said main stream in said circuit.

2. A water system having a main stream circuit provided with a digester, an oxidation turbulence reactor, a photosynthetic process tank, a calcium treatment tank, and a plurality of riffles each provided with a superposed light source; one of said light sources comprising ultraviolet wave lengths between 2500 angstroms and 3000 angstroms means for directing said main stream in said circuit, and culture tanks positioned to receive water from said main stream circuit and return the water thereto.

3. The system of claim 1 in which one of the riffles is positioned between the digester and the oxidation turbulence reactor, and the light source superposed with respect to said riffle provides ultraviolet light.

4. The system of claim 1 in which the calcium treatment tank is provided with a separate water outlet conduit having means for passing a part of the water from the calcium treatment tank to the digester.

5. A closed water system having a main stream circuit provided in the following order with a digester, an oxidation turbulence reactor, a photosynthetic process tank, a calcium treatment tank, a series of filter beds, a riffle positioned to receive water from the filter beds and deliver said water to a processed water basin, a processed water basin and main reservoir positioned to complete the circuit and deliver water to said digester; a source of ultraviolet light having wave length below 3000 angstrom and positioned to irradiate said main stream between the odixation turbulence reactor and the photosynthetic process tank, a source of ultraviolet light having wave length of approximately 3600 angstroms positioned to irradiate said main stream between the photosynthetic process tank and the calcium treatment tank, and sources of fluorescent and incandescent light positioned to irradiate the contents of the photosynthetic process tank and the filter beds.

6. The closed water system of claim 5 provided with a culture tray positioned and provided with connections for receipt of water from the calcium treatment tank plus connections for delivery of water from the culture tray to the filter beds.

7. The water treatment system of claim 5 in which a source of light having wave length of approximately 3600 angstroms acts on the stream between the filters and the basin, and fluorescent and incandescent light is applied to the stream prior to each application thereto of the 3600 angstrom light.

8. The water treatment system of claim 5 in which the 3600 angstrom light acts on the water moving in thin sheets and the fluorescent and incandescent light acts on water moving in a body of considerable depth.

9. The water treatment system of claim 5 in which the light below 3000 angstroms wave length and the light of 3600 angstroms wave length severally act on water moving over the riffles and the fluorescent and incandescent light act on water moving through the photosynthesis process tank and the filters.

10. In a closed water ecosystem having biotic communities a main reservoir positioned to hold water and deliver a circulated quantity of water therefrom, a circuit water having plural spaced tanks severally provided with sources of incandescent and fluorescent light positioned to irradiate water and water borne material passing through said tanks, water circuit connections between said tanks, said connections being provided with ultraviolet light sources in position to irradiate water and water borne material traversing said connections, one of said ultraviolet light sources providing light rays of wave length no greater than 3000 angstroms.

11. The system of claim 10 wherein said water circuit connections include riffles adapted to spread the water shallowly in position for irradiation, and a culture tray having water connection means for delivery of water from one of said riffles to the tray and for delivery of water from the tray to said circuit.

12. The system of claim 11 wherein the circuit is provided with digester means for separation of solids from the circulated water quantity, said digester means being located in position to receive said circulated water directly from the main reservoir, and the calcium treatment tank comprises one of said tanks positioned remotely from the digester means and provided with connections for treated water delivery to the digester and to the culture tray.

13. Water treatment process comprising the successive steps: (1) Pass water from a main reservoir through a digester for removal of solids in the presence of calcium treated water, (2) bubble air through the water for oxidation as it is delivered from the digester, (3) expose the water to ultraviolet irradiation with wave lengths of 2500 to 3000 angstroms, (4) permit development of plant life for photosynthesis under fluorescent and incandescent light sources, (5) expose the water to black light irradiation with wave lengths of approximately 3600 angstroms, (6) aerate and agitate the water in the presence of limestone, (7) filter the water through gravel bed, (8) expose the water to black light irradiation with wave lengths of approximately 3600 angstroms, (9) return the water thus treated to the main reservoir.

14. The process of claim 13 wherein part of the water from step 6 is diverted to a culture tray for culture of growing crop and then returned for further processing.

15. The system of claim 13 in which the water irradiated by said source of ultraviolet light is conducted after such light treatment to a photosynthesis zone for development of vegetation and is thereafter exposed to black light followed by a calcium treatment, a portion of the calcium treated water being returned for additional treatment by said ultraviolet light.

16. Water treatment process comprising the successive steps: (1) Pass water from a main reservoir through a digester for removal of solids in the presence of water which has been treated with calcium and with ultraviolet light, (2) bubble air through the water for oxidation as it is delivered from the digester, (3) expose the water to ultraviolet irradiation with wave lengths of 2500 to 3000 angstroms, (4) permit development of plant life for photosynthesis under fluorescent and incandescent light sources, (5) expose the water to black light irradiation with wave lengths of approximately 3600 angstroms, (6) aerate and agitate the water in the presence of calcium, (7) filter the water through a gravel-sand bed, (8) expose the water to black light irradiation with wave lengths of approximately 3600 angstroms, (9) return the water thus treated to the main reservoir.

17. Water treatment process comprising the successive steps: (1) Pass water from a main reservoir through a digester for removal of solids in the presence of water which has been treated with calcium and with ultraviolet light (2500 A. to 3000 A.), (2) bubble air through the water for oxidation as it is delivered from the digester, (3) expose the water to ultraviolet irradiation with wave lengths of 2500 to 3000 angstroms, (4) permit development of plant life for photosynthesis under fluorescent and incandescent light sources, (5) expose the water to black light irradiation with wave lengths of approximately 3600 angstroms, (6) aerate and agitate the water in the presence of calcium, (7) filter the water through a gravel-sand bed, (8) expose the water to black light irradiation with wave lengths of approximately 3600 angstroms, (9) return the water thus treated to the main reservoir.

References Cited in the file of this patent

UNITED STATES PATENTS

| | | |
|---|---|---|
| 1,175,948 | French | Mar. 21, 1916 |
| 2,043,265 | Roeder | Feb. 12, 1932 |
| 2,222,310 | Emery | Oct. 11, 1937 |
| 2,867,945 | Gotaas | Oct. 19, 1955 |
| 2,747,741 | Jacobson | May 29, 1956 |
| 2,768,137 | Schlenz | Oct. 23, 1956 |
| 2,777,815 | Forrest | Jan. 15, 1957 |
| 2,889,275 | Moore | June 2, 1959 |

OTHER REFERENCES

"Photosynthesis in Sewage Treatment," by Oswald and Gotaas, Proceedings American Society of Civil Engineers, May 1955, vol. 81, Separate No. 686.

"Sewage Treatment," Imhoff and Fair, 2nd Ed., John Wiley and Sons, Inc., New York, pages 3 and 4.

UNITED STATES PATENT OFFICE
CERTIFICATE OF CORRECTION

Patent No. 3,155,609                                November 3, 1964

Leonard Fredrick Pampel

It is hereby certified that error appears in the above numbered patent requiring correction and that the said Letters Patent should read as corrected below.

Column 8, line 44, for "is" read -- in --; column 9, line 2, for "bu" read -- but --; column 10, line 32, for "healtful" read -- healthful --; line 48, for "invtntion" read -- invention --; column 13, line 57, for "veen" read -- been --; column 14, line 69, for "ths" read -- this --; column 15, line 62, for "300" read -- 3000 --; column 16, lines 49 and 50, for "circuit water" read -- water circuit --.

Signed and sealed this 6th day of April 1965.

(SEAL)
Attest:

ERNEST W. SWIDER                                  EDWARD J. BRENNER
Attesting Officer                                       Commissioner of Patents